United States Patent [19]
Buchanan et al.

[11] Patent Number: 5,292,492
[45] Date of Patent: Mar. 8, 1994

[54] RECOVERING SULFUR FROM AMMONIA ACID GAS STREAM

[75] Inventors: J. Scott Buchanan, Mercerville; Jagannathan N. Iyengar, Chester, both of N.J.

[73] Assignee: Mobil Oil Corporation, Fairfax, Va.

[21] Appl. No.: 877,936

[22] Filed: May 4, 1992

[51] Int. Cl.$^5$ .......................................... C01B 17/16
[52] U.S. Cl. ............................. 423/222; 423/224; 423/237; 423/244.02; 423/244.10; 423/574.9
[58] Field of Search .......... 423/222, 224, 237, 243.03, 423/244.02, 244.10, 574 R, 566

[56] References Cited

U.S. PATENT DOCUMENTS

| | | | |
|---|---|---|---|
| 3,764,665 | 10/1973 | Groenendaal et al. | 423/574 |
| 3,835,031 | 9/1974 | Bertolacini et al. | 208/120 |
| 3,928,547 | 12/1975 | Daley et al. | 423/564 |
| 3,947,547 | 3/1976 | Groenendaal et al. | 423/242 |
| 3,957,960 | 5/1976 | Palm et al. | 423/573 G |
| 3,987,154 | 10/1976 | Lagas | 423/574 R |
| 4,041,131 | 8/1977 | Forbes | 423/242 |
| 4,059,418 | 11/1977 | Cull | 55/73 |
| 4,110,087 | 8/1978 | Nolley, Jr. | 55/73 |
| 4,147,763 | 4/1979 | McKinzie et al. | 423/570 |
| 4,193,894 | 3/1980 | Villadsen | 252/440 |
| 4,233,276 | 11/1980 | D'Souza et al. | 423/230 |
| 4,263,020 | 4/1981 | Eberly, Jr. | 55/62 |
| 4,323,544 | 4/1982 | Magder | 423/239 |
| 4,369,130 | 1/1983 | Bertolacini et al. | 252/455 |
| 4,376,103 | 3/1983 | Bertolacini et al. | 4223/244 |
| 4,432,862 | 2/1984 | Swart et al. | 208/64 |
| 4,448,674 | 5/1984 | Batholic | 208/113 |
| 4,459,371 | 7/1984 | Hobbs et al. | 502/341 |
| 4,469,589 | 9/1984 | Yoo et al. | 208/120 |
| 4,471,070 | 9/1984 | Siefert et al. | 502/302 |
| 4,472,267 | 9/1984 | Yoo et al. | 208/120 |
| 4,472,532 | 9/1984 | Mooi | 5022/302 |
| 4,476,245 | 10/1984 | Siefert | 502/302 |
| 4,478,808 | 10/1984 | Matros et al. | 423/522 |
| 4,492,677 | 1/1985 | Yoo et al. | 423/244 |
| 4,492,678 | 1/1985 | Yoo et al. | 423/244 |
| 4,520,003 | 5/1985 | Petersson et al. | 423/533 |
| 4,522,937 | 6/1985 | Yoo et al. | 502/302 |
| 4,613,428 | 9/1986 | Edison | 208/113 |
| 4,617,175 | 10/1986 | Tolpin et al. | 422/171 |
| 4,643,887 | 2/1987 | Daley et al. | 423/533 |
| 4,690,806 | 9/1987 | Schorfheide | 423/230 |
| 4,692,318 | 9/1987 | Tolpin et al. | 423/239 |
| 4,728,635 | 3/1988 | Bhattacharyya et al. | 502/304 |
| 4,735,705 | 4/1988 | Burk, Jr. et al. | 208/113 |
| 4,790,982 | 12/1988 | Yoo et al. | 423/239 |
| 4,826,664 | 5/1989 | Kay et al. | 423/21.1 |
| 4,830,733 | 5/1989 | Nagji et al. | 208/208 |
| 4,830,840 | 5/1989 | Bhattacharyya | 423/239 |
| 4,836,993 | 6/1989 | Bertolacini et al. | 423/244 |
| 4,857,285 | 8/1989 | Gal | 423/230 |
| 4,857,296 | 8/1989 | Brunelle et al. | 423/574 |
| 4,857,297 | 8/1989 | Kettner et al. | 423/576.8 |
| 4,865,826 | 9/1989 | Carnell et al. | 423/230 |
| 4,918,036 | 4/1990 | Rheaume et al. | 502/66 |
| 4,963,520 | 10/1990 | Yoo et al. | 502/64 |
| 4,994,257 | 2/1991 | Suehiro et al. | 423/577 |
| 5,034,369 | 7/1991 | Hebrard et al. | 5022/304 |
| 5,108,979 | 4/1992 | Magnabosco et al. | 502/304 |
| 5,116,798 | 5/1992 | Fennemann | 502/218 |

FOREIGN PATENT DOCUMENTS

| | | |
|---|---|---|
| 0110702 | 8/1988 | European Pat. Off. |
| 0158858 | 10/1991 | European Pat. Off. |
| 8606090 | 10/1986 | PCT Int'l Appl. |
| 8706156 | 10/1987 | PCT Int'l Appl. |

Primary Examiner—Gary P. Straub
Assistant Examiner—Timothy C. Vanoy
Attorney, Agent, or Firm—A. J. McKillop; M. D. Keen

[57] ABSTRACT

Method and system for recovering sulfur from an ammonia acid gas stream containing hydrogen sulfide comprising the steps of combusting the ammonia acid gas stream with air or oxygen to convert the ammonia and the hydrogen sulfide therein to $N_2$ and $SO_x$, respectively, and thus form a nitrogen and sulfur oxide enriched gas stream. The nitrogen and sulfur oxide enriched gas stream is contacted with a solid absorbent bed to extract the sulfur oxides and retain them as sulfur compounds, thus forming a nitrogen bearing stream. The absorbent bed is then contacted with a hydrogen and/or hydrocarbon bearing stream to reduce the retained sulfur compounds to hydrogen sulfide and/or sulfur dioxide and thereby form a hydrogen sulfide and/or sulfur dioxide bearing stream. Sulfur is recovered from the hydrogen sulfide and/or sulfur dioxide bearing stream. The nitrogen bearing stream is sent to an incinerator or vented through a stack.

25 Claims, 2 Drawing Sheets

RECOVERING SULFUR FROM AMMONIA ACID GAS STREAM

BACKGROUND OF THE INVENTION

1. Field of the Invention

The present invention relates to a process and system for extracting sulfur from a gas stream containing hydrogen sulfide. More particularly, the present invention relates to a process and system for desulfurizing ammonia acid gases containing hydrogen sulfide.

2. Description of Prior Art

Refinery streams are typically desulfurized by the Claus process wherein elemental sulfur is produced by reacting hydrogen sulfide and sulfur dioxide in the presence of a catalyst. The Claus system uses a combustion chamber which, at 950° C. to 1,350° C. (1742°-2462° F.), converts 50 to 70% of sulfur contained in the feed gas into elemental sulfur. Sulfur is condensed by cooling the reaction gas to a temperature below the dew point of sulfur after which the remaining gas is heated and further reacted over a catalyst. Normally, the gas passes through at least two such Claus catalyst stages.

The different stages of the process may be represented by the following equations:

$$H_2S + 3/2O_2 \rightarrow SO_2 + H_2O$$

$$2H_2S + SO_2 \rightarrow 3S + 2H_2O$$

The overall reaction is:

$$3H_2S + 3O_2 \rightarrow 3S + 3H_2O$$

Claus exhaust gas still contains small amounts of $H_2S$, $SO_2$, $CS_2$, carbon oxysulfide, CO, and elemental sulfur in the form of a vapor or mist. The exhaust gas generally is subjected to post-combustion to convert substantially everything to $SO_2$ and then further purified by Claus after-treatments.

Ammonia acid gases typically are combusted substoichiometrically at about 2300° F. at the front of the sulfur plant combustion chamber to completely destroy the ammonia. A portion of a clean acid gas (ammonia free) is also introduced along with the ammonia acid gas to control the temperature. The processing of the ammonia acid gas in the combustion chamber increases the sulfur plant size due to the increase in volume of the gases that need to be processed by the sulfur plant. For example, processing of ammonia may increase the hydraulic size of the plant by 20 to 50% based on the amount of ammonia acid gas that is processed. Further, ammonia that is not destroyed in the combustion chamber will form salts. Ammonia and sulfur dioxide react to form a very dense white smog of ammonium hydrosulfide. Ammonia in significant concentration of $CO_2$ will form ammonium bicarbonates. These salts will lay down to plug sulfur seal legs, sulfur condensers, heat exchangers and reactor beds. This salt problem reduces the reliability of the sulfur plant.

SUMMARY OF THE INVENTION

In accordance with a broad aspect of the present invention, there is provided a method of recovering sulfur from an ammonia acid gas stream containing hydrogen sulfide comprising the steps of combusting the ammonia acid gas stream with air or oxygen to convert the ammonia and the hydrogen sulfide therein to $N_2$ and $SO_x$, respectively, and thus form a nitrogen and sulfur oxide enriched gas stream. The nitrogen and sulfur oxide enriched gas stream is contacted with a solid absorbent bed to extract the sulfur oxides and retain them as sulfur compounds, thus forming a nitrogen bearing stream. The sulfur compounds are retained in the bed in the form of inorganic sulfates, sulfur oxides or combinations thereof. The absorbent bed is then contacted with a hydrogen and/or hydrocarbon bearing stream to reduce the retained sulfur compounds to hydrogen sulfide and/or sulfur dioxide and thereby form a hydrogen sulfide and/or sulfur dioxide bearing stream. Sulfur is recovered from the hydrogen sulfide and/or sulfur dioxide bearing stream. The nitrogen bearing stream is sent to an incinerator or vented through a stack.

In accordance with another broad aspect of the present invention, there is provided a system for recovering sulfur from an ammonia acid gas stream containing hydrogen sulfide comprising means for combusting the ammonia acid gas stream with air or oxygen to convert the ammonia and the hydrogen sulfide to $N_2$ and $SO_x$, respectively, and thus form a nitrogen and sulfur oxide enriched gas stream. Means are also provided for contacting the nitrogen and sulfur oxide enriched gas stream with an absorbent bed to extract the sulfur oxides and retain them as inorganic sulfates, sulfur oxides or combinations thereof, and thus forming a nitrogen bearing gas stream. The system also includes means for contacting the sulfur compounds retained by the bed with a hydrogen and/or hydrocarbon bearing stream to reduce the retained sulfur compounds to hydrogen sulfide and/or sulfur dioxide, and thereby form a hydrogen sulfide and/or sulfur dioxide bearing stream. Means are also provided for recovering sulfur from the hydrogen sulfide and/or sulfur dioxide bearing stream.

In accordance with a specific aspect of the present invention, ammonia acid gas is separately combusted in a small combustor with air or oxygen to convert all the $H_2S$ to $SO_x$. The hot gases are then contacted with Mg/Al spinels where the $SO_x$ reacts with the spinel to form inorganic sulfates or sulfur oxides or combinations thereof. Complete or near complete removal of $SO_x$ is achieved. The spinels are then contacted with $H_2$ bearing gases where the sulfates and/or sulfur on the spinels are reduced to $H_2S$ and/or sulfur dioxide. This gas stream containing only $H_2S$ and/or sulfur dioxide, water and unreacted $H_2$ is then sent to the sulfur plant for combustion and sulfur recovery. Absence of ammonia in the acid gas stream fed to the sulfur plant will eliminate all the problems associated with processing ammonia in the sulfur plant. In addition, only a small incremental stream of $H_2S$ and $H_2$ rich gas needs to be processed in the sulfur plant.

DESCRIPTION OF SPECIFIC EMBODIMENTS

Figure 1:
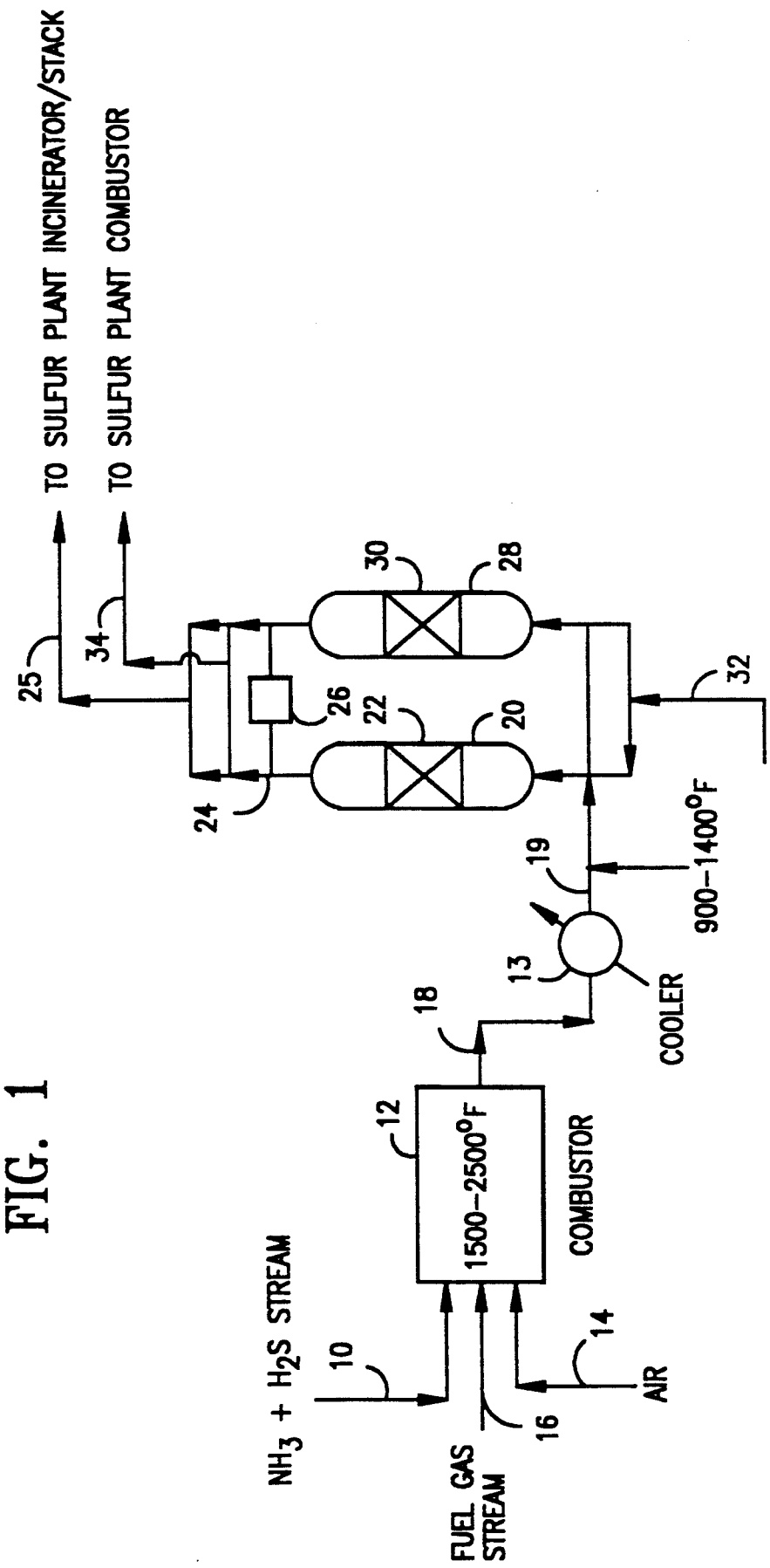
FIG. 1 is a schematic flow diagram of a fixed-bed system for recovering sulfur from ammonia acid gas in accordance with the present invention.

With reference FIG. 1, an ammonia acid gas stream 10 containing hydrogen sulfide is fed to a relatively small combustion furnace 12. An air stream 14 and a fuel gas stream 16 are also fed to the combustion furnace 12 at rates sufficient to maintain the temperature in the furnace 12 within the range of 1500° F. to 2500° F., and to maintain an atmosphere for stoichiometric combustion such that ammonia destruction is maximized and the ammonia is thus completely dissociated into $N_2$ and $H_2$. The $H_2$ will burn to produce water, while the $N_2$ remains as an inert gas. Concurrently, the hydrogen sulfide is completely converted to sulfur oxides ($SO_x$). A nitrogen and sulfur oxide enriched gas stream 18 from the furnace 12 is cooled in a heat exchanger 13 to within a range of from about 900° F. to about 1400° F., and fed by line 19 to a first fixed-bed reactor 20 containing a solid absorbent bed 22.

The solid absorbent bed 22 absorbs substantially all of the sulfur oxide from the nitrogen and sulfur oxide enriched gas stream 18, and provides a nitrogen bearing gas stream through outlet conduit 24. The nitrogen bearing stream is fed through a valve system (not shown) to a line 25 leading to an incinerator or to a stack.

While in an absorbent mode, the reactor 20 is operated at a temperature from about 900° F. to about 1,400° F. A temperature of from about 1,100° F. to about 1,300° F. is preferred. The oxygen content of the stream 19 entering the asorbent bed 22 is in an amount of from about 0.10 to about 10 vol%, 2 to about 4 vol% is preferred. Pressure within the reactor 20 should be maintained at a pressure of from about 0.1 to about 10 atmospheres, preferably from about 1.5 to about 3.0 atmospheres. GHSV should be from about 500 to about 20,000, and preferably from about 3,000 to about 5,000 GHSV. An additional benefit of operating the reactor 22 during the absorbent mode within these parameters is that any carbon monoxide therein is converted into carbon dioxide which is released into the environment. Other gases released from the reactor 20 include nitrogen, oxygen, and trace amounts of sulfur dioxide along with water.

When the combustor 12 is operated stoichiometrically as it is preferred to maximize ammonia destruction, air or oxygen must be added to maintain the oxygen content of the stream 19 as discussed above. However, it is contemplated that the combustor 12 may be operated with excess oxygen supplied by the air stream 14. In this latter case, air or oxygen may not have to be added to the feed stream 19 to the reactor 20.

The absorbent can be in the form of balls, pebbles, spheres, extrudates, channeled monoliths, microspheres or pellets. This sulfur oxide-capturing absorbent provides absorbers or acceptors which absorb, and collect, or otherwise remove sulfur oxides from the influent gaseous stream. In one embodiment, the bed 22 is Mg/Al spinels.

The outlet conduit 24 is monitored by a sensor 26 until sulfur dioxide break-through occurs. A suitable sensor is a Siemens Ultramat 22P infrared analyzer. Of course, as will be understood by those skilled in the art, other comparable analyzing equipment can be used.

Sulfur dioxide break-through occurs when a substantial increase in the concentration of sulfur dioxide occurs in the conduit 24. This increase will be in the order of from about 3 ppm to about 250 ppm in less than about 2 minutes.

When sulfur dioxide break-through is detected, the nitrogen and sulfur oxide enriched gas stream 18 is directed through a suitable valve system (not shown) into a second fixed-bed reactor 28 having a solid absorbent bed 30 therein. Concurrently, the valve system directs a $H_2$ rich stream 32 to the first reactor 20 for regenerating the first absorbent bed 22. The $H_2$ rich stream 32 may contain $H_2$ and/or hydrocarbons.

During regeneration of the absorbent bed 22 the temperature is maintained between about 900° F. to about 1,400° F.; and the pressure in the reactor 20 is maintained at about 0.10 to about 10 atmospheres, preferably about 0.5 to about 3 atmospheres. The $H_2$ and/or hydrocarbon stream 32 is directed into the reactor 20 at a gas hourly space velocity (GHSV) of about 10 to about 1,000, preferably about 100 to about 150. Initially, a GHSV of about 300 is preferred when commencing regeneration of a fixed-bed absorbent so that a higher concentration of liberated gases can be removed from the regenerator. As regeneration proceeds, the GHSV can be reduced to about 50 as the concentration of liberated gases diminishes. Similarly, although hydrogen is the preferred reducing gas for regeneration, other hydrocarbon reducing gases can be used. These will preferably comprise $C_1$ through $C_5$ hydrocarbons. Substantially improved regeneration results are anticipated when water is co-fed into the reactor along with the hydrocarbons. The $H_2$ and/or hydrocarbon stream 32 may contain 0.0 to 50% water.

Regeneration of the bed 22 provides a hydrogen sulfide and/or sulfur dioxide bearing stream through the outlet conduit 24, the valve system (not shown), and via line 34 to the sulfur plant for recovery of sulfur. The hydrogen sulfide and/or sulfur dioxide bearing stream may also contain water and unconverted reducing gas.

The nitrogen and sulfur oxide enriched stream 18 and the hydrogen and/or hydrocarbon bearing stream 32 are alternately fed to each one of the reactors 20,28, whereby each bed 22,30 is first spent by sulfur oxides extracted from the stream 18, and then regenerated by the hydrogen and/or hydrocarbon bearing stream 32.

Figure 2:
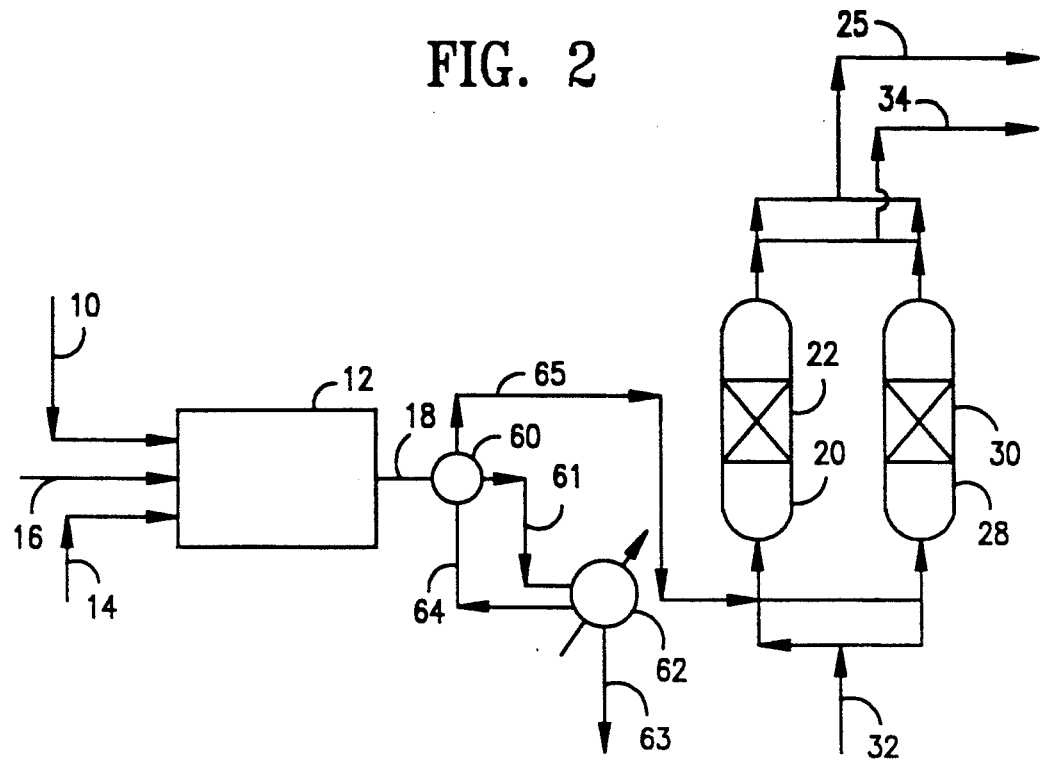
FIG. 2 shows another embodiment of the present invention wherein sulfur is also recovered at an intermediate location in the system of FIG. 1.

With reference to FIG. 2, there is shown a modification of the system of FIG. 1 for extracting sulfur from the nitrogen and sulfur oxide enriched stream 18 before the stream 18 is fed to one of the reactors 20,28. Specifically, the enriched stream 18 is passed through a heat exchanger 60, line 61 to a cooler/condenser 62 where the nitrogen and sulfur oxide enriched stream 18 is cooled to from about 250° F. to about 300° F. to allow elemental sulfur to condense out as a liquid sulfur stream 63. The remainder of the enriched stream is looped back through the heat exchanger 60 via line 64 to reheat the enriched stream to within the range of from about 900° F. to about 1400° F., and preferably from about 1,100° F. to about 1,300° F., for input by line 65 to one of the reactors 22,30. If there is stoichiometric combustion in the combustor 12, this cooling and reheating loop may extract from about 10% to about 60% of the sulfur content of the combustor output stream 18. The remaining elements of FIG. 2 function in the same manner as identically numbered elements of FIG. 1 described hereinabove.

Figure 3:
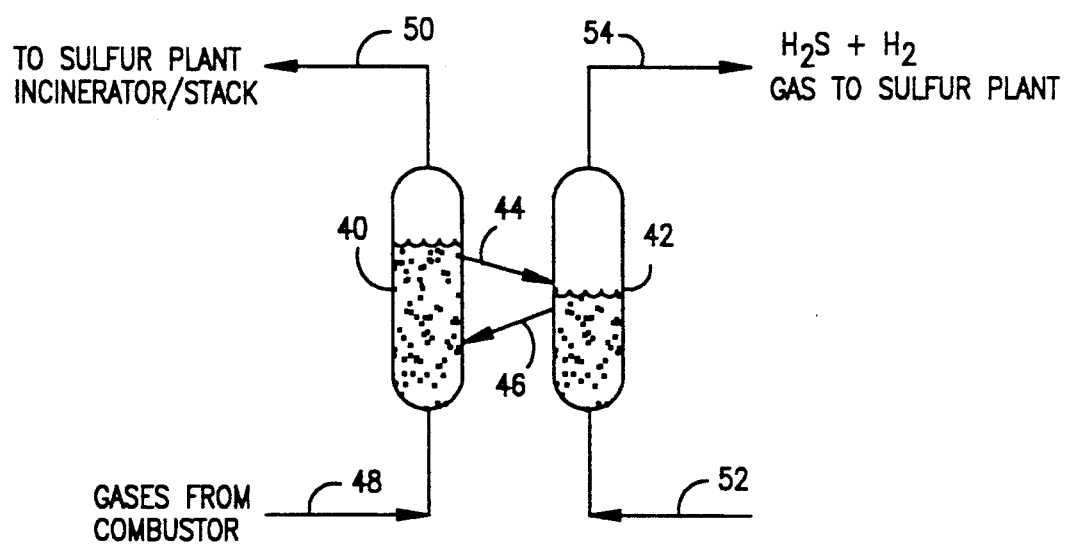
FIG. 3 is a schematic flow diagram of a fluidized bed system for recovering sulfur in accordance with another embodiment of the present invention.

With reference to FIG. 3, there is shown a fluidized bed system comprising a reactor 40, a regenerator 42, a conduit 44 for feeding spent absorbent from the reactor 40 to the regenerator 42, and another conduit 46 for passing a fluidized bed of regenerated absorbent from the regenerator 42 to the reactor 40. A nitrogen and sulfur oxide enriched stream 48 from the combustor 12 (FIG. 1) is fed to the lower end of the reactor 40, over absorbent therein to strip out the sulfur oxides and provide a nitrogen enriched stream 50 for the incinerator or the stack. A hydrogen bearing stream 52 is fed to the bottom of the regenerator 42 to reduce the sulfur compounds on the spent absorbent to hydrogen sulfide and form a hydrogen sulfide and/or sulfur dioxide bearing outlet stream 54.

Operating parameters for the fluidized system are substantially the same as those described above with respect to the FIGS. 1 or 2 fixed-bed embodiments. Further, the operating conditions for the combustor 12 are similar when using either the fluidized or fixed bed systems. The temperature in the fluidized bed reactor 40 is maintained at from about 900° F. to about 1,400° F., preferably between about 1,100° F. to about 1,300° F. The oxygen content of the stream 48 introduced into the reactor 40 is maintained in an amount of from about 0.1 to about 10 vol%, preferably 2 to about 4 vol%. Pressure in the reactor 40 should be maintained at about 0.1 to about 10 atmospheres, preferably about 1.5 to about 3 atmospheres. The GHSV should be maintained at about 400 to about 7,000, preferably about 500 to about 2,500.

The following discussed absorbents are described in U.S. Pat. No. 4,692,318 which patent is hereby incorporated herein by reference. Absorbents which can be used preferably comprise substantially alumina, and most preferably alumina compounded with magnesia, for best results. Gamma alumina, chi-eta-rho alumina, delta alumina, and theta alumina are particularly useful as adsorbents and supports because of their high surface areas.

The term "adsorbent" is used interchangeably herein with the term "absorbent." While alpha alumina and beta alumina can be used as adsorbents, they are not as effective as gamma, chi-eta-rho, delta and theta alumina. One or more oxides of other metals can also be used as adsorbents, either alone or in combination with alumina or as spinels, such as bismuth, manganese, yttrium, antimony, tin, copper, Group 1a metals, Group 2a metals, rare earth metals, and combinations thereof. Magnesium aluminate spinels are particularly useful as absorbers. Lanthanum and cerium are preferred rare earth metals. Naturally occurring rare earths, such as in the form of baestenite, are also useful absorbers. Elemental copper or copper compound absorbers, such as copper oxide absorbers, can also be used. The copper oxide can be cuprous oxide and/or cupric oxide. Other copper compounds can be used, such as copper (II) sulfate, copper (II) acetate, copper (II) formate, copper (II) nitrate and/or copper (II) chloride. The absorbers can also be a blend/mixture of high density and low density materials.

The metal or metal oxide part of the absorbers can be supported, carried and held on a refractory support or carrier material which also provides part of the absorbers. The support controls the attrition and surface area characteristics of the absorbers. The support preferably has a surface area greater than about 10 m²/g and most preferably from about 50 m²/g to about 500 m²/g for best results. Suitable supporters include, but are not limited to, silica, alumina, kaolin or other clays, diatomaceous earth, boria, and/or mullite. The support can comprise the same material as the metal or metal oxide part of the absorbers.

The absorbers can be impregnated or otherwise coated with an oxidizing catalyst or promoter that promotes the removal of sulfur oxides and/or nitrogen oxides. One useful catalyst is ceria (cerium oxide). Another useful catalyst is platinum. Other catalytic metals, both free and in combined form, preferably as an oxide form, can be used, either alone or in combination with each other or in combination with ceria and/or alumina, such as rare earth metals, metals from Group 8 of the Periodic Table, chromium, vanadium, rhenium, tungsten, silver and combinations thereof. The promoter can comprise the same material as the absorber. An even distribution of the promoter is preferred for best results and to minimize adsorbent erosion.

The Group 1a metals, Group 2a metals, and Group 8 metals referred to are those listed in the Periodic Table of the Elements in the *Handbook of Chemistry and Physics* (54th Edition). Useful Group 1a metals include lithium, sodium, potassium, rubidium, and cesium. Useful Group 2a metals include magnesium, calcium, strontium, and barium. Useful Group 8 metals are the Group 8 noble metals (the platinum family of metals) including ruthenium, rhodium, palladium, osmium, iridium, and platinum. The rare earth metals are also useful and are referred to as the lanthanides. Suitable rare earth metals include cerium, praseodymium, neodymium, samarium, europium, gadolinium, terbium, dysprosium, holmium, erbium, thulium, ytterbium, and lutetium.

Other absorbents useful in the practice of the present invention are the metal containing spinels disclosed in U.S. Pat. No. 4,790,982 which patent is incorporated herein by reference. One absorbent in U.S. Pat. No. 4,790,982 that is particularly suitable for use in the instant invention is the magnesium, aluminum-containing spinel impregnated with 2% vanadium and 10% cerium shown in Example 10 of the patent.

The following examples are illustrative of sorbents suitable for use in the reactor beds of the present invention.

EXAMPLE 1

A ceria/alumina sorbent was prepared by impregnating high pore value gamma alumina (⅛" extrudate from Dycat International) with a solution of 32.7 grams Ce(NO$_3$)$_6$· 6H$_2$O from Aldrich Chemical Company in 45 grams of water, using an incipient wetness technique. The material was dried three hours at 120° C. (248° F.) and calcined one hour at 700° C. (1,292° F.), in air. The composition was approximately 11% CeO$_2$/Al$_2$O$_3$. This material was crushed and sieved to 14/60 mesh (API).

EXAMPLE 2

A magnesium aluminate sorbent was prepared, starting with two solutions. Solution I contained 461.5 grams magnesium nitrate, 68.6 grams of concentrated nitric acid, and 500 mls of water. Solution II contained 209.7 grams sodium aluminate, 10.7 grams sodium hydroxide, and 500 mls of water. To Solution I were added 2 liters of water, and then over a 30 minute period, Solution II. Sodium hydroxide was then added in an amount to bring the pH up to 10.7. The resulting mixture was aged for 16 hours and then filtered. The recovered solids were dried at 170° C. (338° F.) for 12 hours and sized to 14/60 mesh (API). This material had a composition of about Mg$_2$Al$_2$O$_5$.

EXAMPLE 3

To make a sorbent with approximately 100 ppm platinum loading, 35 grams of the magnesium aluminate from Example 2 was impregnated using an incipient wetness technique with a solution of 0.013 gram of chloroplatinic acid (37% Pt. assay) in 16 mls of water. The resulting solids were calcined in air at 450° C. (810° F.) for three hours and sized to 14/60 mesh (API).

EXAMPLE 4

A sorbent with approximately 10% ceria loading on magnesium aluminate was prepared by adding a solution of 9.71 grams cerium nitrate in 16 mls of water to 35 grams of magnesium aluminate from Example 1, using an incipient wetness method. The material was then dried for three hours at 120° C. (248° F.), calcined in air one hour at 700° C. (1,292° F.), and sized to 14/60 mesh (API).

To test the sorbents' ability to sorb sulfur oxides from a gas mixture simulating an incinerated Claus tail-gas, 6 grams of each material described in Examples 1-4 were loaded in an 11 mm I.D. quartz reactor with a central thermowell. The reactor was placed in a radiant furnace for rapid heating and cooling. A gas flow of 360 cc/minute with a composition of 1% sulfur dioxide, 4% oxygen, and 95% nitrogen (on a dry basis) was established through the reactor, after the desired sorption temperature was attained. Water, in the amount of about 20% of the gas flow, as added by directing part of the feed gases through a saturator held at about 150° F.

The sulfur dioxide content in the effluent stream was monitored with a Siemens Ultramat 22P infrared analyzer. A cold trap between the reactor and the analyzer removed most of the water on the effluent stream. Sorption experiments were terminated when the sulfur dioxide level in the effluent exceeded 250 ppm. Sulfur dioxide breakthrough was relatively sharp. In general, the analyzer detected no sulfur dioxide for the first 80-90% of the sorption period. Sulfur dioxide concentration of less than 2 ppm during this portion of the sorption was confirmed by measurements with Drager gas measurement tubes. The calculated weight percentage uptake of sulfur oxide as $SO_3$ during the sorption period is reported in the Table below.

Regeneration of the solid sorbent was accomplished by contacting it with hydrogen, which was bubbled through a saturator to obtain about 25% water vapor content. The composition of the off-gas during reductive regeneration was determined by injections on to a Hewlett-Packard 5890 gas chromatograph equipped with a thermal conductivity detector. Usually, both hydrogen sulfide and Sulfur dioxide could be detected in the off-gas, but typically one gas or the other dominated, depending on the sorbent and on operating conditions, as indicated in the following Table.

TABLE

| Sorbent Material Identity | Temperature of Sorption and Regeneration, °F. | Wt % Uptake During Sorption | Dominate Sulfur Compound In Regeneration Off-Gas |
|---|---|---|---|
| $CeO_2/Al_2O_3$ (Ex. 1) | 1,000 | 4.8 | $H_2S$ |
| $CeO_2/Al_2O_3$ | 1,200 | 6.2 | $SO_2$ |
| $Mg_2Al_2O_5$ (Ex. 2) | 1,200 | 4.7 | $H_2S$ |
| $Pt/Mg_2Al_2O_5$ (Ex. 3) | 1,200 | 33.8 | $SO_2$ |
| $CeO_2/Mg_2Al_2O_5$ (Ex. 4) | 1,100 | 14.7 | $H_2S$ |
| $CeO_2/Mg_2Al_2O_5$ | 1,200 | 25.2 | $SO_2$ |

The uptake of $SO_x$ was greater for $Mg_2Al_2O_5$ promoted with Pt (Ex.3) and with $CeO_2$ (Ex.4) was higher than for $Mg_2Al_2O_5$ alone (Ex.2). For the ceria-promoted materials of Examples 1 and 4, magnesium aluminate was a more effective sorbent than alumina, and increasing the operating temperatures from 1000°F. to 1200°F. (Ex.1), and from 1100°F. to 1200°F. (Ex.4) increased $SO_x$ sorption which shifted the dominant off-gas sulfur species from $H_2S$ to $SO_2$.

EXAMPLE 5

The carbon monoxide oxidation activity of two sorbents was tested by flowing a mixture of 4% carbon monoxide, 4% oxygen, and 8% carbon dioxide at a flow rate of 310 cc/min over 6 grams of each material in an 11 mm I.D. quartz reactor. Carbon monoxide and carbon dioxide concentration, as a function of reactor temperature, were monitored by Beckman Model 864 infrared analyzers. With the magnesium aluminate of Example 2, carbon monoxide was half converted at about 770° F. and substantially all converted at 860° F. With the platinum-promoted magnesium aluminate of Example 3, carbon monoxide was half converted at about 510° F. and substantially all converted at 540° F. With an empty reactor, there was no detectable carbon monoxide conversion for temperatures up to 1,200° F.

This example demonstrates that the designated sorbents are effective in promoting the removal of carbon monoxide in the presence of oxygen.

Application Ser. No. 07/868,432, filed Apr. 15, 1992 by J. S. Buchanan, D. L. Stern, J. F. Sodomin and G. T. Teitman for Process for Desulfurizing Claus Tail-Gas is incorporated herein by reference. Application Ser. No. 07/868,432 relates to a process for extracting sulfur from a gas containing hydrogen sulfide and sulfur oxides.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method of recovering sulfur from an ammonia acid gas stream containing hydrogen sulfide comprising the steps of:
    combusting said ammonia acid gas stream in a combustor with an excess of air or oxygen to convert the ammonia and all of the hydrogen sulfide therein to $N_2$ and $SO_x$, respectively, and thus forming a nitrogen and sulfur oxide enriched gas stream;
    contacting said nitrogen and sulfur oxide enriched gas stream with a solid absorbent bed for adsorbing thereon the sulfur oxides in the form of inorganic sulfates or sulfur oxides or combinations thereof, and thus forming a nitrogen bearing stream;

contacting said absorbent bed with a hydrogen and/or hydrocarbon bearing stream to regenerate said absorbent bed by reducing said retained inorganic sulfates or sulfur oxides or combinations thereof to hydrogen sulfide optionally with sulfur dioxide, and thereby forming a hydrogen sulfide bearing stream optionally with sulfur dioxide,; and recovering sulfur from said hydrogen sulfide bearing stream in a sulfur plant.

2. The method of claim 1 wherein said ammonia acid gas stream is combusted at a temperature of from about 1500° F. to about 2500° F.

3. The method of claim 2 wherein said ammonia acid gas stream is combusted with fuel gas.

4. The method of claim 2 wherein said nitrogen and sulfur oxide stream contacting said solid absorbent bed has an oxygen content of from about 0.10 vol% to about 10 vol%.

5. The method of claim 4 wherein oxygen content is from about 2 vol% to about 4 vol%.

6. The method of claim 2 wherein said solid absorbent bed while absorbing the sulfur oxides thereon is operated at a gas hourly space velocity of from about 500 GHSV to about 20,000 GHSV, a pressure of from about 0.1 atm to about 10 atm, and a temperature of from about 900° F. to about 1400° F.

7. The method of claim 6 wherein the GHSV is from about 3,000 to about 5,000.

8. The method of claim 6 wherein said temperature is from about 1,100° F. to about 1,300° F.

9. The method of claim 6 wherein said pressure is from about 1.5 atm to about 3.0 atm.

10. The method of claim 2 wherein said solid absorbent bed while being regenerated is operated at a temperature of from about 900° F. to about 1,400° F., at a pressure of from about 0.10 atm to about 10 atm, and a gas hourly space velocity 10 GHSV to about 1,000 GHSV.

11. The method of claim 10 wherein said temperature is from about 1,100° F. to about 1,300° F.

12. The method of claim 10 wherein said pressure is from about 0.5 atm to about 3.0 atm.

13. The method of claim 10 wherein said GHSV is from about 100 to about 150.

14. The method of claim 2 wherein said nitrogen and sulfur oxide enriched stream is passed through a heat exchanger and to a condenser for reducing the temperature of said enriched stream to from about 250° F. to about 300° F. to condense elemental sulfur out of said enriched stream as a liquid sulfur stream, thereafter said enriched stream being looped back through said heat exchanger to be reheated to from about 900° F. to about 1,400° F. for contacting said solid absorbent bed.

15. The method of claim 2 wherein said nitrogen and sulfur oxide enriched stream is passed through a heat exchanger for reducing the temperature of said enriched stream to a range of from about 900° F. to about 1,400° F. for contacting said solid absorbent bed.

16. The method of claim 2 wherein at least two fixed-bed reactors in a parallel arrangement include the solid absorbent in respective beds, said nitrogen and sulfur oxide enriched stream is fed to a first one of said reactors until the bed therein is spent with inorganic sulfates or sulfur dioxides or combinations thereof; thereafter said nitrogen and sulfur oxide enriched gas stream is fed to a second one of said reactors, and said hydrogen and/or hydrocarbon bearing gas stream is fed to said first one of said reactors to form said hydrogen sulfide bearing stream and thus regenerate said first one of said reactors.

17. The method of claim 16 wherein said nitrogen and sulfur oxide enriched gas stream and said hydrogen and/or hydrocarbon bearing gas stream are alternately fed to each one of said reactors, whereby each bed is first spent with said inorganic sulfates or sulfur dioxides or combinations thereof absorbed thereon from said nitrogen and sulfur oxide enriched gas stream and then regenerated by said hydrogen and/or hydrocarbon bearing stream to form said hydrogen sulfide bearing stream.

18. The method of claim 2 wherein said solid absorbent bed is in a fluidized bed system comprising a reactor, a regenerator, a conduit for feeding spent absorbent from the reactor to the regenerator, and another conduit for passing regenerated absorbent from the regenerator to the reactor; and wherein said nitrogen and sulfur oxide enriched gas stream is fed to the reactor to absorb said inorganic sulfates or sulfur dioxides or combinations thereof on the absorbent, and said hydrogen and/or hydrocarbon bearing stream is fed to the regenerator to reduce said inorganic sulfates or sulfur oxides or combinations thereof to said hydrogen sulfide bearing stream.

19. The method of claim 18 wherein said ammonia acid gas stream is combusted in an oxidizing atmosphere.

20. The method of claim 2 wherein said nitrogen bearing stream is fed to an incinerator or is vented.

21. The method of claim 2 wherein the solid absorbent is alumina impregnated with a rare earth.

22. The method of claim 2 wherein the solid absorbent is Mg/Al spinels.

23. The method of claim 2 wherein the solid absorbent is magnesium, aluminum-containing spinel impregnated with vanadium and cerium.

24. The method of claim 2 wherein the solid absorbent is magnesium aluminate impregnated with an oxygen promoter.

25. The method of claim 24 wherein said promoter is $CeO_2$ and/or Pt.

* * * * *